Jan. 17, 1939.   A. KÖNIG ET AL   2,144,262
MEASURING MARK FOR STEREOSCOPIC RANGE FINDERS
Filed July 8, 1937

Inventors:
Albert König
Konrad Kühlmann

UNITED STATES PATENT OFFICE 2,144,262

MEASURING MARK FOR STEREOSCOPIC RANGE FINDERS

Albert König and Konrad Kühne, Jena, Germany, assignors, by mesne assignments, to Bausch & Lomb Optical Company, Rochester, N. Y., a corporation of New York Application July 8, 1937, Serial No. 152,546
In Germany July 17, 1936

4 Claims. (Cl. 88—2.7)

In stereoscopic rangefinders, measuring marks are used, as a rule, which are visible in the field of view as dark lines, dots or the like. When working with such rangefinders, an object visible in the field of view at a definite apparent distance often happens to be covered by a stereoscopic measuring mark of a greater apparent distance, a phenomenon which disturbs stereoscopic vision on account of the actual impossibility of a remote object covering from sight an object at a nearer range. In the telescope systems of rangefinders, the measuring marks were disposed originally in the image planes of the eye-pieces. Later on it was found out, however, that these marks can be located at another place and imaged in the said planes, the physical marks in the path of the imaging rays being, accordingly, replaced by optical marks.

The invention concerns such measuring marks for stereoscopic rangefinders as overcome the said disturbance of stereoscopic vision even when the corresponding stereoscopic mark covers an object seemingly nearer. This advantage can be obtained by using physical or optical measuring marks which are, according to the invention, two-dimensional and transparent. The stereoscopic image of these marks covers the object visible in the field of view of the rangefinder without hiding or interrupting the contours of these objects. After some practice, and especially when not too great an intrinsic brilliancy is imparted to the marks, it will be easy to imagine that, for instance, those parts of the imaged objects which are covered by the image of an apparently more distant stereoscopic mark are shone through by this mark as if by distant light.

Marks fulfilling the said condition can be of different constructional forms. The mark may be, for instance, a transparent layer on a glass plate, such layers being obtained by slightly blackening a photographic layer or so silvering a corresponding part of the glass plate that light can still pass through.

In another suitable constructional form, the mark plate is a thin metal sheet which is opaque and has an aperture whose image in the image field constitutes the optical mark. A further, and very advantageous, constructional form is obtained by using as a mark plate a glass plate carrying a photographic layer which is opaque with the exception of a part constituting the mark. As a matter of course, the marks are to be illuminated accordingly if useful images are to appear in the field of view of the eye-piece.

Figure 1:
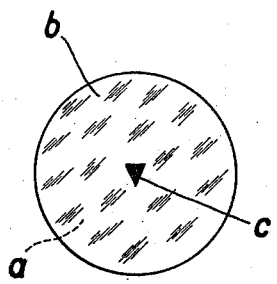
Figure 2:
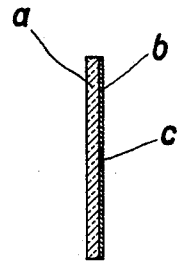
Figure 3:
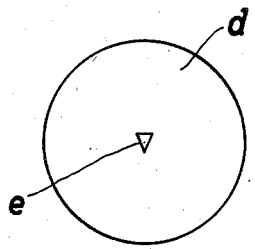
Figure 4:
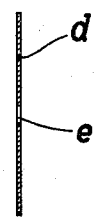
Figure 5:
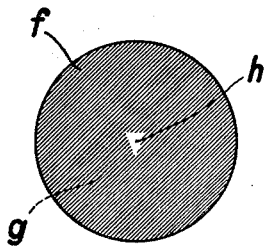
Figure 6:
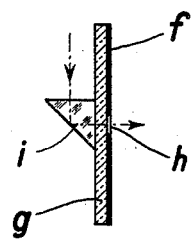
Figure 7:
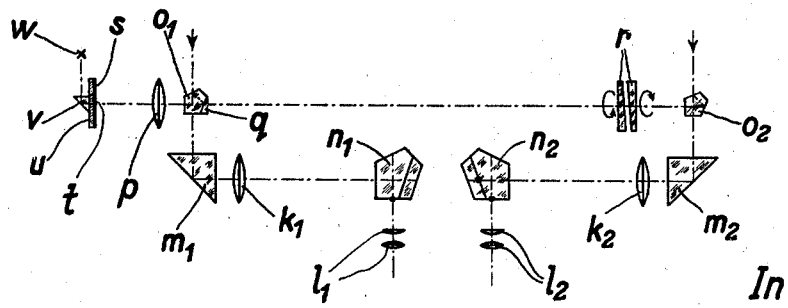

The accompanying drawing illustrates three constructional examples of the invention, Figures 1, 3 and 5 are top views of these examples, and Figures 2, 4 and 6 represent corresponding central elevational sections. Figure 7 illustrates in schematic plan section the effect of the third constructional example in a stereoscopic rangefinder.

The first example (Figures 1 and 2) is a mark plate $a$ of glass carrying a photographic layer $b$. This layer $b$ is transparent with the exception of a surface $c$ which constitutes the mark and is so blackened as to be semi-transparent.

In the second example (Figures 3 and 4), the mark plate is a thin metal sheet having an aperture $e$ to be used as an optical mark.

The third example (Figures 5 and 6) is a glass plate $g$ carrying a photographic layer $f$. This layer $f$ is so blackened as to be opaque with the exception of a part $h$. The same effect can be obtained when an opaque silver layer is used instead of the blackened part of the layer $f$. In the example represented in the drawing, the transparent mark $h$ is illuminated by light striking one side of a prism $i$.

The optical system for stereoscopic rangefinders which is illustrated in Figure 7 comprises two telescope systems having, respectively, objectives $k_1$ and $k_2$ and eye-pieces $l_1$ and $l_2$. Near the exterior sides of the objectives $k_1$ and $k_2$ are disposed triangular prisms $m_1$ and $m_2$, respectively, the bases of which are so silvered as to be opaque. Between the objectives and the eye-pieces are pentagonal prisms $n_1$ and $n_2$ each of which has one reflecting roof-surface. Those light exit surfaces of the prisms $n_1$ and $n_2$ which face the eye-pieces coincide with the planes in which objects at a great distance are imaged by the objectives $k_1$ and $k_2$. These planes are, at the same time, the focal planes of the eye-pieces $l_1$ and $l_2$. On the object sides of the triangular prisms $m_1$ and $m_2$, pentagonal prisms $o_1$ and $o_2$, respectively, are so disposed that their light entrance surfaces face a collimator lens $p$. That reflecting surface of the pentagonal prism $o_1$ which is remote from the light entrance surface of this prism, is semi-transparent and cemented to a triangular prism $q$ complementing the pentagonal prism $o_1$ to a plano-parallel glass plate. The pentagonal prisms $o_1$ and $o_2$ are so small that they are struck by only a small part of the imaging rays entering the triangular prisms $m_1$ and $m_2$. Between the two pentagonal prisms $o_1$ and $o_2$ is disposed a rotating-wedge compensator $r$ which, as is well known, consists of two glass wedges rotatable in opposite senses. In the focal plane of the collimator lens $p$ is a transparent silver layer $s$ having a triangular aperture $t$. The silver layer $s$ covers a carrier $u$ of glass with the exception of the part $t$. A source of light $w$ and a triangular prism $v$ cemented to the other surface of the carrier $u$ illuminate the triangle $t$.

The illuminated aperture $t$ serves as a measuring mark in the stereoscopic rangefinder and is imaged by the collimator lens $p$ at a great distance. The imaging rays strike first the pentagonal prism $o_1$, the semi-transparent reflecting surface of which divides them in such a manner that one part of these rays are directed by way of the other reflecting surface of the prism $o_1$ to the reflecting surface of the triangular prism $m_1$, whence the said rays, together with those rays imaging the object which did not strike the prism $o_1$, are reflected to the objective $k_1$. The other part of the rays striking the semi-transparent surface of the prism $o_1$ traverse this surface and the triangular prism $q$ and, subsequently to having gone through the rotating-wedge compensator $r$, they arrive in the pentagonal prism $o_2$. On account of double reflection, the rays are so deviated by this prism $o_2$ at right angles that they strike the reflecting surface of the pentagonal prism $m_2$, whence they as well as those imaging rays of the far object which did not strike the prism $o_2$ are directed to the objective $k_2$.

The path the rays imaging the object take in the stereoscopic rangefinder is considered to be known. In the focal planes of the eye-pieces $l_1$ and $l_2$ appear two images of the object, the stereoscopic combination of which provides a stereoscopic image of the object. Simultaneously with the images of the object, there are projected in the said focal planes images of the illuminated aperture $t$. The stereoscopic combination of these images provides a stereoscopic mark image constituting the measuring mark of the rangefinder and superposed on the stereoscopic image of the object. An image of an illuminated diaphragm aperture being concerned, the details of the object image which are covered by the stereoscopic measuring mark can be seen distinctly through this mark. The apparent distance of the stereoscopic measuring mark depends on the adjustment of the glass wedges of the compensator $r$. By rotating the compensator $r$, the measuring mark is given the apparent distance which coincides with that of the object whose range is to be measured, this range being found in the known manner from the adjustment of the compensator.

We claim:

1. An optical system for stereoscopic rangefinders comprising two telescope systems, each of said telescope systems consisting of an objective, an eye-piece, an end reflector for deflecting the imaging ray pencil at right angles in the direction of the base of said rangefinder, and a reflecting system for deflecting the imaging ray at right angles in the direction of the eye-piece axis, said optical system further comprising a convergent lens system, a two-dimensional measuring mark, two optical squares, and a deflecting means, said measuring mark being transparent and lying in a plane coinciding with the focal plane of said lens system, said two optical squares being arranged in advance of said end reflectors for projection of a light ray pencil from said measuring mark to each of said end reflectors, and said deflecting means being arranged for deflection at a variable angle of one of the two ray pencils entering one of said optical squares.

2. In an optical system according to claim 1, a mark plate of glass, said measuring mark being a transparent layer on said mark plate.

3. In an optical system according to claim 1, an opaque mark plate, said measuring mark being an aperture of said mark plate.

4. In an optical system according to claim 1, an opaque mark plate, said mark plate being a thin opaque layer on a carrier of glass, said measuring mark being a transparent part of said opaque layer.

ALBERT KÖNIG.
KONRAD KÜHNE.